Feb. 20, 1951 R. L. DOSIER 2,542,910
LOADING DEVICE
Filed Dec. 18, 1945
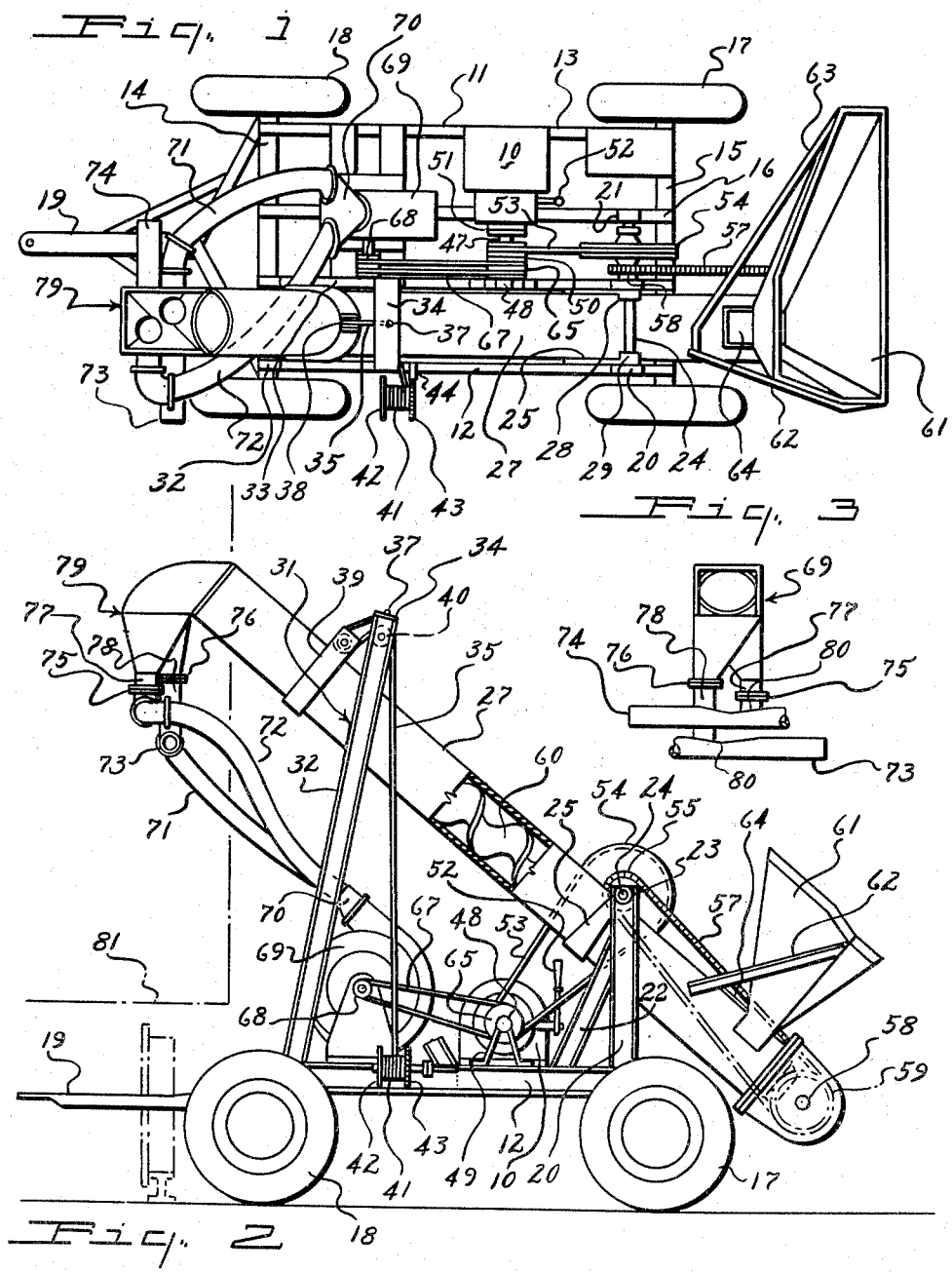
Inventor
Robert L. Dosier
By Mason & Graham
Attys.

Patented Feb. 20, 1951

2,542,910

UNITED STATES PATENT OFFICE 2,542,910

LOADING DEVICE

Robert L. Dosier, Monterey Park, Calif., assignor of fifty per cent to Stephen F. Jack, Los Angeles, Calif.

Application December 18, 1945, Serial No. 635,629

7 Claims. (Cl. 198—6)

My present invention relates to a loading device, and more particularly to a device for loading freight cars with bulk materials of a size and weight capable of being pneumatically propelled through, and discharged at relatively high velocity from, a discharge nozzle.

At present, freight car loaders are in use whereby material to be loaded is allowed to fall on whirling elements which throw the material out by centrifugal force in a cascade directed toward an end of a freight car in which the loader is positioned. These present loaders, while satisfactory in many ways, are not suitable for loading all bulk materials, and are further limited by the necessity of having the loader wholly within the car while loading the end zones of the car.

In the loading of a freight car, such as a box car, with the granular material, for example bulk wheat, it is desirable to load the car from its ends toward the center. This is true because the door through which the loading is accomplished normally is in the center of the freight car and it is desired to keep the door area clear of the material being loaded as long as possible.

An object of the invention is to make an improved and simplified loader for loading bulk materials.

Another object is to make a car loader having a slow speed mechanical conveyor and a high speed pneumatic discharge nozzle for transporting and discharging bulk materials.

A further object is to make a combined mechanical and pneumatic device for loading bulk materials, said device having a two-way air induced discharge arrangement.

A further object is to make an improved pneumatic car loader adapted to be supported exteriorly of a freight car, a discharge end portion thereof being adapted to enter a freight car door, said discharge end portion having diametrically opposite two-way pneumatic nozzles for discharging bulk materials toward both ends of the car simultaneously.

In order to attain these objects, and others which will be apparent from a perusal of the following description and the accompanying drawings, I provide in accordance with one feature of the invention a mechanical conveyor, of low speed and relatively high capacity, with an intake hopper having an adjustable port opening into an intake portion of the mechanical conveyor and a divided hopper at a discharge end of the mechanical conveyor, the divisions of which open into oppositely disposed pneumatic nozzles which are supplied by a compressor with air so as to divide the air into two streams flowing at high velocity in opposite directions.

These and other features of the invention will be more fully set forth in the following description and the accompanying drawings, in which:

Fig. 1 is a plan view of a car loader embodying the invention;

Fig. 2 is a view in side elevation of the loader shown in Fig. 1 with a portion of a spiral conveyor housing broken away; and Fig. 3 is a fragmentary front view showing a discharge head with discharge nozzles and portions of air tubes mounted thereon.

Referring to the drawings, which show an embodiment of the invention, a motor 10 preferably is mounted upon a chassis 11 having longitudinal frame members 12, 13 and 16, and cross frame members 14 and 15. Rear wheels 17 and steerable front wheels 18 are mounted on the frame. A tongue 19 may be provided for towing the apparatus behind a truck or tractor, not shown, when it is desired to transport the loader. A rear frame comprises a pair of upright channeled frame members 20 and 21 which are secured to the longitudinally extending chassis frame members 12 and 16, respectively, and are braced in position by channeled braces 22. A bearing 23 is mounted on the upper end of each of the upright support members 20 and 21, and a shaft 24 is journaled in these bearings. A cradle 25 for supporting a conveyor pipe 27 for pivotal movement in a vertical plane has bearings 28 and 29 at its upper end to fit onto the supporting shaft 24. The conveyor pipe 27 is mounted in the cradle 25 to pivot on the shaft 24 as a fulcrum.

A front frame 31 is mounted on the chassis 11, and comprises upright side members 32 and 33 which are spaced apart to permit free vertical movement of the conveyor pipe 27 therebetween. A top cross frame member 34, of sufficient strength to support the conveyor pipe when fully loaded with the heaviest materials the device is intended to handle, is mounted across the tops of the upright frame members 32 and 33.

The conveyor pipe 27 is arranged for vertical adjustment by means of a cable 35. One end 37 of the cable is secured to the top cross frame member 34. From here the cable extends downwardly and passes beneath a pulley 38, mounted between the upright ends of a metal band 39 which encircles the conveyor pipe 27. Thence the cable extends upwardly again and around a pulley 40 mounted beneath the top cross frame member 34. From the pulley 40 the cable 35 extends downwardly and is wound onto the drum 41 of a hand-operated winch 42 which is mounted on the chassis 11. By means of the winch the discharge end of the conveyor pipe 27 may be raised or lowered to a desired adjusted position. A ratchet 43 and pawl 44 are arranged to secure the winch against an unwinding of the cable therefrom.

The power unit 10, which may be a gasoline or electric motor, has a drive shaft 47 which extends outwardly and has its outer end supported in a bearing 48 which is mounted on a bearing support 49 secured to the chassis frame member 12. A drive pulley 50 is mounted for rotation on the shaft 47 and is arranged to have releasable driven connection with the drive shaft by means of a clutch 51. A clutch operating lever 52 is operatively connected to the clutch.

A drive belt 53 passes around the pulley 50 and also around a driven pulley 54 which is mounted to rotate freely on the shaft 24. The pulley 54 has a sprocket 55 affixed to a side thereof, and a drive chain 57 passes around the sprocket 55 and also around a sprocket 59 which is secured to a shaft 58 mounted transversely of the lower end of the conveyor pipe 27. The shaft 58 on which the sprocket 59 is secured is connected by reduction gears (not shown) to a conveyor spiral 60 which is mounted for rotation in the conveyor pipe 27.

An intake hopper 61 is mounted over an intake opening in the lower end of the conveyor pipe and is secured in position thereon as by angle braces 62 and 63. A sliding intake control door 64 is mounted over the port from the hopper 61 into the conveyor pipe, and projects through a slotted opening in the forward wall of the intake hopper so as to be available exteriorly of the hopper for manual adjustment of the size of the port from the hopper into the conveyor pipe.

A fan drive pulley 65 is secured to the drive shaft 47 outwardly beyond the clutch controlled drive pulley 50. From the fan drive pulley 65 a pair of V-belts 67 are mounted around a driven pulley 68 of a sirocco type blower fan 69 which is mounted on the chassis 11. A tubular Y connection 70 is mounted over the discharge end of the blower fan, and a pair of flexible tubes 71 and 72 which may be of rigid walled flexible tubing are mounted one over each of the branches of the Y connection. The opposite end of each of the flexible tubes is connected to one of a pair of oppositely disposed discharge nozzles 73 and 74. The nozzles are connected by swivel connections 75 and 76 to a pair of discharge tubes 77 and 78 opening into a divided hopper 79 which is mounted beneath the upper or discharge end of the conveyor pipe 27 to receive the material as it is discharged by the spiral conveyor. Each of the nozzles 73 and 74 is constructed to have a Venturi throat portion 80, and the tubes 77 and 78 from the discharge hopper 79 of the spiral conveyor are mounted to enter the nozzles at points of low pressure in the Venturi throats so as to facilitate the flow of material into the nozzles.

In operating the device for loading a freight car, such as that indicated by dotted lines 81 in Fig. 2, the loader is moved into position beside a freight car, and the upper or discharge end of the spiral conveyor pipe 27 with its supported nozzles 73 and 74 is arranged, by means of the winch 42 and cable 35, at a convenient elevation for loading the car.

If the loader is to be mounted on a loading platform (not shown) at the height of the car floor, as sometimes is desirable in loading freight cars, the discharge end of the conveyor may be lowered to a suitable height by means of the winch 42, so that the discharge end of the loader can occupy the same relative position with respect to the freight car, as when the loader is on the ground alongside the car.

After the loader is mounted in a desired position for loading, the motor of the power unit is energized and the clutch 51 is engaged to drive the conveyor spiral 60 and the blower fan 69. The intake control door 64 preferably is placed initially in a partly closed position so as to restrict the port from the intake hopper 61 into the conveyor pipe to prevent overloading the conveyor until a suitable flow rate has been established. The intake hopper 61 then is partly filled with the bulk material to be loaded, not illustrated, and more of the material is added as required to keep the intake hopper at least partly full at all times during operation.

The machine is allowed to operate at this initial adjustment until the spiral screw 60 carries the material upwardly to fill the conveyor pipe and discharge some of the material from the discharge end of the divided discharge hopper 79. From here the material will flow through the tubes 77 and 78, and thence into the nozzles 73 and 74. From the nozzles the material will be blown at high velocity toward the opposite ends of the car.

The discharge nozzles will handle a greater quantity of some materials than of others, and their capacity also will vary with the same material with variations in the moisture content thereof. However, if the nozzles show a tendency to load up and become choked, the condition can be corrected by further restricting the port from the intake hopper into the conveyor pipe by means of the intake control door 64.

To assist in clearing the nozzles in case they become thus choked, the spiral 60 can be stopped, temporarily, by releasing the clutch 51. Since the blower fan drive pulley 65 is secured directly to the shaft 47, the fan will continue to run, thereby clearing the nozzles. When the nozzles are cleared, the clutch can be re-engaged to continue to supply material to the nozzles, and the sliding door can be readjusted as required to control the flow of material through the conveyor.

As the loading of the car progresses, the discharge end of the conveyor can be raised as required to throw the material higher, and thereby farther, toward the ends of the car. By manually swinging the nozzles about their swivel connections 75 and 76 either of the streams discharged thereby can be diverted laterally as required to distribute the material properly in the car.

While I have illustrated and described a preferred form of the invention, it will be apparent to those familiar with the art that the invention is not limited to the specific structure illustrated, but is capable of various modifications without departing from the spirit and scope of my invention. It is not desired to limit the invention, therefore, except as defined in the appended claims.

I claim:

1. A car loader comprising in combination a wheeled support, a conveyor pipe adjustably mounted thereon for tilting in a vertical plane, said pipe having a delivery end, an intake hopper mounted on the conveyor pipe spaced from the delivery end thereof and having an intake port opening into the conveyor pipe, an intake control door mounted to adjust the size of the intake port, a spiral conveyor screw rotatably mounted in the conveyor pipe, a pair of oppositely disposed nozzles mounted adjacent a delivery end of the conveyor pipe and supported thereby to receive the material discharged therefrom, a blower mounted on the support, power drive means mounted on the support and having driving connection with the conveyor screw and the blower, a pair of flexible air tubes connected from the blower to the nozzles respectively, and means for securing the nozzles in adjusted position, to direct a pair of streams of discharged material in opposite directions therefrom.

2. A car loader for loading bulk materials comprising in combination a mechanical flight conveyor having an inlet opening at one end and a discharge opening at the other, an intake hopper mounted to discharge into the inlet opening of the conveyor, inlet control means mounted across the conveyor inlet opening to adjust the size thereof, a fulcrumed support for the mechanical conveyor, elevating means connected to the support and to the conveyor adjustably to elevate the discharge end of the conveyor, a divided hopper mounted at the discharge end of the conveyor to receive material discharged thereby, a nozzle adjustable in a horizontal plane openly connected to each division of the divided hopper to receive material by gravity flow therefrom, and air blast means connected to each nozzle forcibly to eject said material from the nozzles in independently directable streams remotely from the nozzles.

3. A car loader for loading bulk materials comprising in combination a mechanical flight conveyor having an inlet opening at one end and a discharge opening at the other, a fulcrumed support for the mechanical conveyor, elevating means connected to the support and to the conveyor adjustably to elevate the discharge end of the conveyor, the discharge end portion of the conveyor projecting outwardly beyond the support and the elevating means for insertion of said discharge end portion in a freight car door opening, a divided hopper mounted at the discharge end of the conveyor to receive material discharged thereby, a pair of horizontal, oppositely directed nozzles openly connected one to each division of the divided hopper to receive material by gravity flow therefrom, and air blast means connected to each nozzle forcibly to eject said material from the nozzle in a pair of streams remotely from the nozzle.

4. A car loader for loading bulk materials comprising in combination a mechanical flight conveyor having an inlet opening at one end and a discharge opening at the other, a fulcrumed support for the mechanical conveyor, elevating means connected to the support and to the conveyor adjustably to elevate the discharge end of the conveyor, a two-way divided hopper mounted at the discharge end of the conveyor to receive material discharged thereby, a pair of nozzles each of which has a Venturi throat portion openly connected to one division of the divided hopper to receive material by gravity flow therefrom, said nozzles being pointed in substantially opposite directions, and divided air blast means, a division thereof being connected to discharge through each of the nozzles, respectively, forcibly to eject said material from the nozzles in two oppositely directed streams.

5. A car loader for loading bulk materials comprising in combination a mechanical flight conveyor having an inlet opening at one end and a discharge opening at the other, a support for the mechanical conveyor, said conveyor being mounted on the support, elevating means connected to the support and to the conveyor adjustably to elevate the discharge end of the conveyor, a divided hopper mounted at the discharge end of the conveyor to receive material discharged thereby, a pair of directionally adjustable nozzles openly connected one to each division of the divided hopper to receive material by gravity flow therefrom, a blower fan, a pair of flexible tubular members, each connecting an air outlet of the blower fan to one of the nozzles, a motor, drive means connecting the motor to the blower fan, and releasable drive means connecting the motor to the flight conveyor, whereby intermittent driving of the mechanical flight conveyor may be accomplished during continuous operation of the blower.

6. A carloader for loading bulk materials comprising in combination a mechanical flight conveyor having an inlet opening at one end and a discharge opening at the other, a fulcrumed support for the mechanical conveyor, elevating means connected to the support and to the conveyor adjustably to elevate the discharge end of the conveyor, a divided hopper mounted at the discharge end of the conveyor to receive material discharged thereby, a nozzle openly connected to each division of the divided hopper to receive material by gravity flow therefrom, said nozzles being pivotally mounted for adjustment about axes which extend substantially vertically when the conveyor is elevated whereby to permit the positioning of the nozzles to discharge in substantially opposite directions, air blast means connected to each nozzle for conveying air under pressure forcibly to eject said material from the nozzles in two streams.

7. In a carloader for loading bulk material, a supporting frame, a mechanical flight conveyor pivotally mounted on said frame for vertical swinging movement, said conveyor having an inlet opening at one end and a discharge opening at the other, elevating means mounted on the frame and operatively connected to said conveyor adjustably to elevate the discharge end of said conveyor, an intake hopper mounted to discharge into the inlet opening of the conveyor, a hopper mounted on the discharge end of said conveyor to receive material discharged thereby, a nozzle mounted on said last-mentioned hopper, said nozzle being mounted for adjustable pivotal movement about an axis extending substantially vertically when the conveyor is elevated, and air blast means mounted on said frame for supplying air under pressure to said nozzle.

ROBERT L. DOSIER.

REFERENCES CITED

The following references are of record in the file of this patent:

UNITED STATES PATENTS

| Number | Name | Date |
| --- | --- | --- |
| 634,775 | Suderman et al. | Oct. 10, 1899 |
| 672,409 | Scheidegger | Apr. 16, 1901 |
| 741,108 | Camp | Oct. 13, 1903 |
| 916,578 | Murphy | Mar. 30, 1909 |
| 1,058,455 | Muller | Apr. 8, 1913 |
| 1,462,570 | McKay | Nov. 24, 1925 |
| 1,895,180 | Tough | Jan. 24, 1933 |
| 2,123,878 | Brady | July 19, 1938 |
| 2,179,408 | Gregoric | Nov. 7, 1939 |